Feb. 25, 1930.	F. M. SHOREY	1,748,085
PROTECTOR FOR GROWING CROPS
Filed Jan. 21, 1923
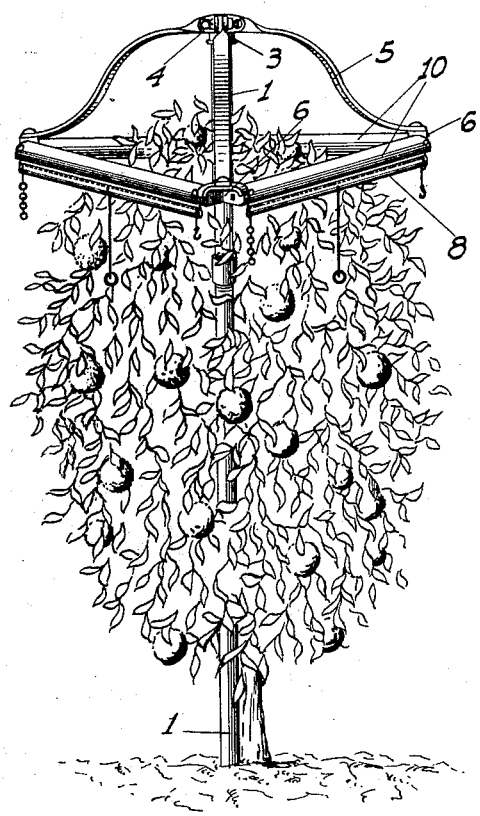
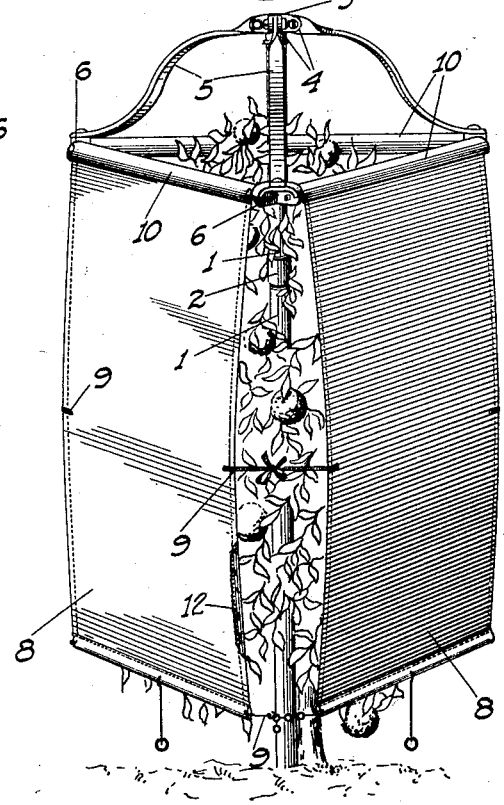
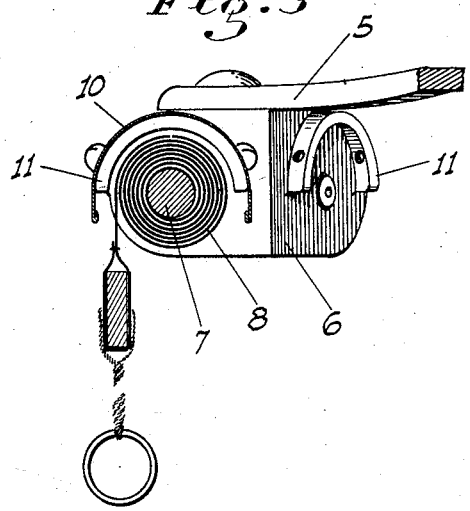
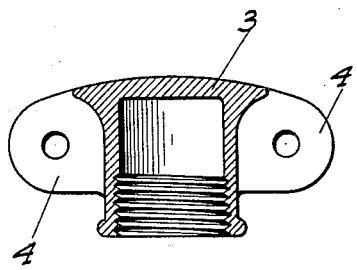
INVENTOR
F. M. Shorey
BY
ATTORNEY Patented Feb. 25, 1930

1,748,085

UNITED STATES PATENT OFFICE

FRED M. SHOREY, OF MODESTO, CALIFORNIA

PROTECTOR FOR GROWING CROPS

Application filed January 21, 1928. Serial No. 248,319.

This invention relates to devices for protecting growing crops from the harmful effects of the elements, especially to a device for protecting deciduous and other fruits from damage by frost.

The principal object of my invention is to provide a device for the purpose which is arranged as an individual protector for each tree or vine, to be permanently mounted in connection therewith, and having curtains to extend around the tree and enable the crop thereon to be protected at any time between the setting of the blossom and the maturing of the fruit, from exposure to frost and also from the harmful effects of severe or drying winds.

At the same time, the curtains are mounted in such a manner that when they are not needed they are out of the way so that they offer no material interference with the free passage of the sun's rays to the tree. Also the curtains are then themselves protected against deterioration from the action of sun or rain.

A further object of the invention is to arrange the curtains so that they may be quickly moved to a protecting position or as quickly retracted. The device while permanently mounted in connection with the tree, offers no interference with the placing of a fumigating hood over the tree as is done at a certain time of the year.

As a result of the use of this device, especially in connection with orange trees, I have found from actual experiment that the fruit on one side of a tree, which was protected against the ravages of frost, etc., by the curtains, attained its full growth, color and flavor, while the fruit on the other side of the same tree left unprotected was stunted in size, frost-bitten, and of poor color.

These objects I accomplish by means of such structure and relative arrangement of parts as will fully appear by a perusal of the following specification and claims.

In the drawings similar characters of reference indicate corresponding parts in the several views:

Fig. 1 is a perspective elevation of my protecting device arranged in connection with a tree showing the curtains rolled up.

Fig. 2 is a similar view showing the curtains lowered.

Fig. 3 is a cross section of a curtain roller and curtain thereon showing the supporting bracket for the curtain roller and the protecting hood for the rolled-up curtain.

Fig. 4 is a sectional view of an arm supporting cap for the main standard or post.

Referring now more particularly to the characters of reference on the drawings, the numeral 1 denotes a post preferably a galvanized pipe which is sunk into the ground a certain distance and extends upwardly adjacent the trunk of the tree to a short distance above the top thereof. This post is preferably made of two or more lengths of pipe, detachably connected together by common sleeve couplings 2, so that the height of the completed post may be varied according to the height of the tree and may be extended as the tree grows.

A cap 3 is detachably screwed on to the top section of the post, said cap having a plurality of radially projecting ears or lugs 4. Arms 5 are secured to these lugs and extend radially and downwardly therefrom to connections at their outer ends with brackets 6. Each bracket is arranged to support the adjacent ends of a pair of curtain rollers 7 of standard form such as are used in connection with window shades, and which are provided with spring wind-up means which is of common use and which it is not therefore deemed necessary to show. The rollers and their brackets enclose a horizontal area which is substantially that of the tree to be protected, and while I show a three roller arrangement, it will be obvious that four or more and a corresponding number of brackets and arms may be used if desired or found expedient.

Flexible curtains 8 are wound on the rollers, the length of these curtains being sufficient to depend to adjacent the ground when unrolled as shown in Fig. 2. The curtains when thus unrolled or lowered substantially enclose and surround the tree on all sides as will be evident except for the unavoidable vertical openings between adjacent curtains.

Flexible tapes 9 or the like may be connected to the vertical adjacent edges of the curtains to enable the same to be drawn together somewhat and prevent them from possibly flapping in the wind. The curtains are made of suitable material so as to be strong, flexible and waterproof and yet inexpensive. Various materials having these qualifications may be used but I have in mind to employ a tough grade of suitably treated paper which I have found from actual experiment to be excellent for the purpose.

To protect the curtains when rolled up, inverted trough-shaped hoods 10 extend over the curtain rollers and between the corresponding brackets, being secured in place by screwing said hoods to flanges 11 which project outwardly from the bracket faces and are preferably concentric with the rollers. Apart from serving as a protector for the curtains when rolled up, these hoods also serve as braces between the brackets, taking off any strain from the curtain rollers which might tend to cause the same to bend.

The cap arms 5 and the brackets are so shaped and connected together as to eliminate any sharp projections or the like which might catch a fumigating hood when the same is being placed about or removed from the tree, and in fact the structure is beneficial rather than detrimental since it forms a support for the hood.

To raise the curtains it is only necessary to untie the tapes and manipulate the curtains in the same manner as ordinary window shades are handled, since the curtains will then roll up of themselves on the rollers. When the curtains are thus rolled up the area occupied thereby is not sufficient to interfere with the proper action of the sun on the tree, and the structure is then out of the way so as not to interfere with fruit picking, pruning, or other operations.

All parts of the structure are detachably connected together, so that it is an easy matter to assemble or dismantle the structure, especially since each part of it is relatively small and light.

When the curtains are made of paper, they are preferably reinforced along their edges by ribbons 12 of flexible and non-rust metal such as copper; the curtains being formed with hems along such edges in which the ribbons are inclosed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tree protector including a plurality of curtains to depend about and substantially surround a tree, rollers about which said curtains are adapted to wind, a common bracket for the adjacent ends of adjacent rollers, arms connected to all the brackets, and a member supporting all said arms in common at a given distance from the ground.

2. In a tree protecting device, a fabric curtain and flexible metal ribbons enclosed in hems provided along the side edges of the curtain.

In testimony whereof I affix my signature.

FRED M. SHOREY.